(12) United States Patent
Galbreath et al.

(10) Patent No.: US 7,946,649 B2
(45) Date of Patent: May 24, 2011

(54) VEHICLE SEAT ASSEMBLY HAVING LAYERED SEATING SYSTEM WITH ATTACHMENT MEMBER

(75) Inventors: Ashford A. Galbreath, Troy, MI (US); Asad S. Ali, Troy, MI (US); Richard Reyes, Clinton Township, MI (US); Jeffrey Frelich, Commerce Township, MI (US); Ronald L. Miotto, Redford, MI (US); James B. Clauser, Oakland Township, MI (US); George Edward Dishner, Davison, MI (US); William Paruszkiewicz, Clinton Township, MI (US); Paul S. Severinski, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/236,226

(22) Filed: Sep. 23, 2008

(65) Prior Publication Data

US 2009/0085384 A1 Apr. 2, 2009

Related U.S. Application Data

(60) Provisional application No. 60/997,052, filed on Oct. 1, 2007, provisional application No. 61/007,715, filed on Dec. 13, 2007.

(51) Int. Cl.
*A47C 7/24* (2006.01)
*A47C 31/02* (2006.01)

(52) U.S. Cl. ............... 297/218.1; 297/218.2; 297/218.3; 297/218.4; 297/218.5; 297/452.6

(58) Field of Classification Search ............... 297/218.1, 297/218.2, 218.3, 218.4, 218.5, 452.6
See application file for complete search history.

(56) References Cited

U.S. PATENT DOCUMENTS

| 3,630,572 | A | * | 12/1971 | Homier | 297/452.6 |
| 3,961,823 | A | * | 6/1976 | Caudill, Jr. | 297/452.6 |
| 4,317,591 | A | * | 3/1982 | Ramsey | 297/452.6 |
| 4,465,534 | A | | 8/1984 | Zelkowitz | |
| 4,579,389 | A | * | 4/1986 | Shimbori et al. | 297/452.6 |
| 4,606,580 | A | * | 8/1986 | Yoshizawa | 297/452.6 |
| 4,609,226 | A | * | 9/1986 | Yoshizawa | 297/452.6 |
| 4,718,718 | A | * | 1/1988 | Maruyama | 297/452.6 X |

(Continued)

FOREIGN PATENT DOCUMENTS

DE 297 05 593 U1 5/1977

(Continued)

OTHER PUBLICATIONS

Chinese Office Action dated Sep. 8, 2010 (3 pgs.) in corresponding Chinese Appn. No. 200810169514.4, filed Oct. 6, 2008.

(Continued)

*Primary Examiner* — Rodney B White
(74) *Attorney, Agent, or Firm* — Brooks Kushman P.C.

(57) ABSTRACT

A vehicle seat assembly has a seat body adapted to be mounted within a vehicle to provide support to an occupant. A seat component is provided adjacent to the seat body. A first attachment member is provided within one of the seat body and the seat component. A second attachment member is provided on the other of the seat body and the seat component. The second attachment member is engageable within the first attachment member such that the seat component is attached to the seat body through engagement between the first attachment member and the second attachment member.

19 Claims, 10 Drawing Sheets

U.S. PATENT DOCUMENTS

| | | | | |
|---|---|---|---|---|
| 4,834,451 | A * | 5/1989 | Meunier et al. | 297/218.2 |
| 4,865,383 | A * | 9/1989 | Sbaragli et al. | 297/218.2 |
| 5,605,373 | A | 2/1997 | Wildern, IV et al. | |
| 5,641,552 | A * | 6/1997 | Tillner | 297/452.6 X |
| 5,723,197 | A | 3/1998 | Grund et al. | |
| 5,733,001 | A * | 3/1998 | Roberts | 297/218.1 |
| 5,820,213 | A * | 10/1998 | Severinski | 297/218.5 |
| 5,826,939 | A * | 10/1998 | Beyer | 297/218.3 |
| 5,882,073 | A | 3/1999 | Burchi et al. | |
| 5,964,017 | A * | 10/1999 | Roberts | 297/218.1 X |
| 5,993,955 | A | 11/1999 | Mense | |
| 6,027,171 | A | 2/2000 | Partington et al. | |
| 6,048,025 | A * | 4/2000 | Tillner | 297/218.1 |
| 6,199,252 | B1 | 3/2001 | Masters et al. | |
| 6,206,467 | B1 * | 3/2001 | Mense et al. | 297/218.2 |
| 6,241,188 | B1 | 6/2001 | Simpson et al. | |
| 6,478,382 | B1 | 11/2002 | Schulte | |
| 6,568,761 | B2 * | 5/2003 | Perske et al. | 297/452.6 |
| 6,592,181 | B2 * | 7/2003 | Stiller et al. | 297/218.2 |
| 6,652,034 | B1 * | 11/2003 | Schramm et al. | 297/452.35 |
| 6,899,399 | B2 | 5/2005 | Ali et al. | |
| 6,964,453 | B1 * | 11/2005 | Flegal et al. | 297/452.6 |
| 7,017,997 | B2 * | 3/2006 | Takezawa et al. | 297/452.6 |
| 7,134,730 | B2 * | 11/2006 | Flegal et al. | 297/452.6 |
| 7,287,305 | B2 * | 10/2007 | Bednarski | 297/218.3 X |
| 7,296,852 | B2 * | 11/2007 | Huse | 297/218.1 |
| 7,407,227 | B1 | 8/2008 | Tuccinardi et al. | |
| 7,481,489 | B2 * | 1/2009 | Demick | 297/218.1 |
| 7,506,939 | B2 * | 3/2009 | Brockschneider et al. | 297/452.6 |
| 7,559,100 | B2 * | 7/2009 | Pedde et al. | 297/218.2 X |
| 7,568,761 | B2 * | 8/2009 | Mashimo | 297/218.4 |
| 7,585,030 | B2 * | 9/2009 | Galbreath et al. | 297/452.27 |
| 7,600,304 | B2 * | 10/2009 | Nagele et al. | 29/91.1 |
| 2002/0074845 | A1 * | 6/2002 | Perske et al. | 297/452.6 |
| 2002/0101109 | A1 | 8/2002 | Stiller et al. | |
| 2002/0117882 | A1 * | 8/2002 | Takezawa | 297/218.1 |
| 2003/0001421 | A1 * | 1/2003 | Schmidt | 297/452.6 |
| 2003/0030319 | A1 | 2/2003 | Clapper | |
| 2005/0150090 | A1 * | 7/2005 | Pedde et al. | 24/698.1 |
| 2005/0269855 | A1 * | 12/2005 | Flegal et al. | 297/452.6 |
| 2006/0061192 | A1 * | 3/2006 | Flegal et al. | 297/452.6 |
| 2006/0237986 | A1 * | 10/2006 | Brockschneider et al. | 296/65.09 |
| 2008/0018162 | A1 * | 1/2008 | Galbreath et al. | 297/452.48 |
| 2008/0258523 | A1 * | 10/2008 | Santin et al. | 297/218.2 |
| 2009/0033131 | A1 * | 2/2009 | Clauser et al. | 297/218.4 |
| 2009/0085384 | A1 * | 4/2009 | Galbreath et al. | 297/218.1 |
| 2009/0302664 | A1 * | 12/2009 | Galbreath et al. | 297/452.48 |

FOREIGN PATENT DOCUMENTS

| | | |
|---|---|---|
| DE | 3 631 778 A1 | 4/1988 |
| DE | 298 21 697 U1 | 2/1999 |
| DE | 693 29 284 T2 | 3/2001 |
| DE | 101 19 807 A1 | 10/2002 |
| DE | 20 2006 019 999 U1 | 7/2007 |
| EP | 0 345 806 A2 | 12/1989 |
| EP | 1 795 393 B1 | 1/2009 |

OTHER PUBLICATIONS

German Office Action dated Nov. 2, 2010 from corresponding German Appn. No. 10 2008 050 183.2, filed Oct. 1, 2008, 6 pgs.

* cited by examiner

VEHICLE SEAT ASSEMBLY HAVING LAYERED SEATING SYSTEM WITH ATTACHMENT MEMBER

CROSS-REFERENCE TO RELATED APPLICATIONS

This application claims the benefit of U.S. provisional applications Ser. No. 60/997,052 filed Oct. 1, 2007 and Ser. No. 61/007,715 filed Dec. 13, 2007, which are incorporated by reference herein.

BACKGROUND

1. Technical Field

Multiple embodiments relate to a vehicle seat assembly having a layered seating system.

2. Background Art

Most seat assemblies include three fundamental components: (a) a frame to support the seat assembly and mount it to a body, such as a vehicle; (b) a foam cushion to cover the frame; and (c) trim material to cover the foam cushion and provide a durable surface for contact with a seat assembly occupant. A conventional vehicle seat design typically involves the mixing of base construction polymers joined in a manner that is difficult to disassemble and not focused on environmentally friendly material use.

Accordingly, there is a need for a vehicle seat assembly which is environmentally friendly, structurally sound and comfortable, and relatively easy to assemble and disassemble as needed.

SUMMARY

A vehicle seat assembly is disclosed herein. In one embodiment, a seat body is adapted to be mounted within a vehicle to provide support to an occupant. A seat component is provided adjacent to the seat body. A first attachment member is provided within one of the seat body and the seat component. A second attachment member is provided on the other of the seat body and the seat component. The second attachment member is engageable within the first attachment member such that the seat component is attached to the seat body through engagement between the first attachment member and the second attachment member.

In another embodiment, a vehicle seat assembly comprises a cushion composite comprising a structural layer and a cushion layer adjacent to the structural layer, and a trim material secured over the cushion composite. In at least one embodiment, the structural layer has one or more attachment members embedded therein such that one of the trim material and the cushion layer is attached to the embedded attachment member.

In yet another embodiment, a vehicle seat assembly includes a seat body having a cushion portion and a seat cover to at least partially cover the seat body. A first attachment member is provided within one of the seat body and the seat component. A second attachment member is provided on the other of the seat body and the seat component. The second attachment member is engageable within the first attachment member and to be at least partially retained by the first attachment member when engaged and the seat cover is attached to the cushion portion through engagement between the first attachment member and the second attachment member.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in the description are to be enlisted as modified by the word "about" in describing the broader scope of the invention. Practice within the numerical limit stated is generally preferred. Also, unless expressly stated to the contrary, the description of a group or class of materials is suitable or preferred for a given purpose in connection with the invention implies that mixtures of any two or more members of this group or class may be equally suitable or preferred.

Figure 1:
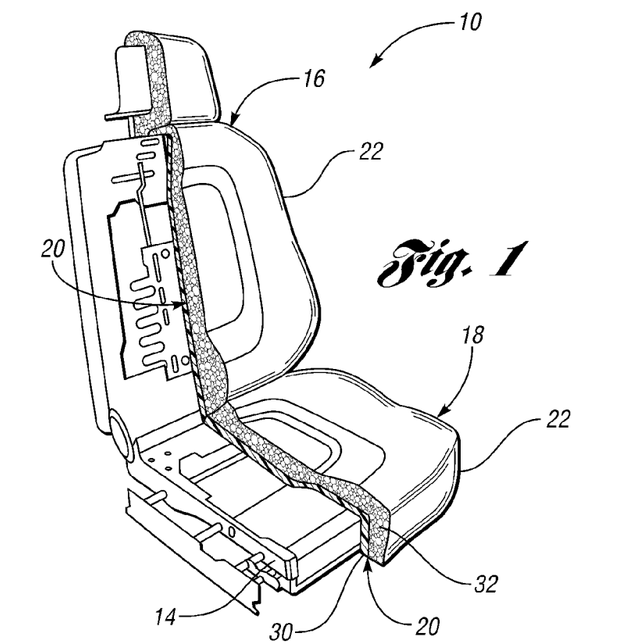
FIG. 1 is a schematic cut-away environmental view of an embodiment of a vehicle seat assembly.

Referring to FIG. 1, a vehicle seat assembly 10 is illustrated. While the vehicle seat assembly 10 is illustrated in FIG. 1 to be a bucket seat assembly, it should be understood that the principles of the invention are applicable to other types of seat assemblies, such as bench, captain and other types of seat assemblies. It should also be understood that the principles of the present invention are applicable to other configurations where foam is a component, such as backrests, back support pads, armrests, and head restraints. Still further, it should be understood that the principles of this invention are applicable to all types of vehicle seat assemblies. Furthermore, it should be understood that the teachings of the multiple embodiments are not limited to applications on automobiles but may be employed on any type of vehicle including, without limitation, aircraft, watercraft, spacecraft, and other types of landcraft including trains as well as non-vehicle seat assemblies.

As shown in FIG. 1, the vehicle seat assembly 10 includes a seat frame, generally indicated at 14 having a plurality of mounting brackets adapted to operatively secure the seat frame 14 within a vehicle. The seat frame 14 may be constructed from any materials suitable for application within a vehicle seat assembly 10, such as aluminum, steel or other metal alloy, composite material, or a suitable polymer. Further, the seat frame 14 may be manufactured using techniques commonly known in the art, and relative to the type of material employed. By way of example, the manufacturing techniques may include stamping, welding, fastening or molding a suitable material to form the seat frame 14.

Figure 2A:
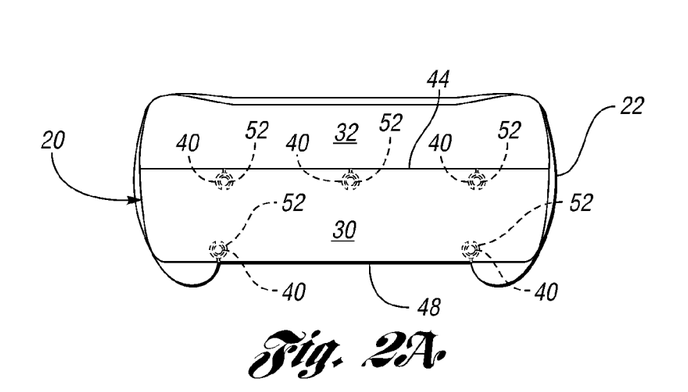
FIG. 2A is a schematic front view of at least one embodiment of a portion of a seat assembly.
Figure 2B:
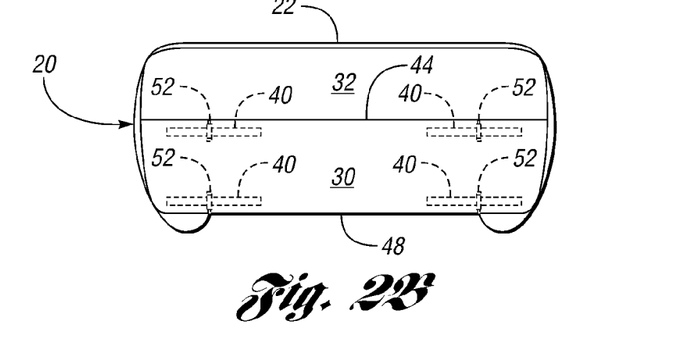
FIG. 2B is a view similar to FIG. 2A but showing a side view.

The vehicle seat assembly 10 also includes a seat back, generally indicated at 16 and a lower seat assembly, generally indicated at 18. In at least the illustrated embodiment, the seat back 16 and the lower seat assembly 18 each have the same cushion composite 20 covered by a trim material 22. However, it should be understood that the configuration of the cushion composite 20 for the seat back 16 can differ from the configuration of the cushion composite 20 of the lower seat assembly 18. Likewise, it should be understood that the trim material 22 for the seat back 16 can differ from the trim material for the lower seat assembly 18. As can be seen in FIGS. 1, 2A and 2B, the cushion composite 20 includes a structural layer 30, in at least the illustrated embodiments, disposed over frame 14 and a cushion layer 32 that is disposed over the structural layer 30. The cushion composite 20 could include other optional layers such as a comfort pad. As will be explained further below, each of the layers cooperate with and in some embodiments are secured to each other in a manner such that they are relatively easily separable for recycling at end of use.

The structural layer 30 can be any suitable structural foam material. In at least one embodiment, suitable structural materials will have a rigidity and/or density that is higher than conventional polyurethane foam. In at least one embodiment, suitable structural foam materials have a density of at least 1.75 pounds per cubic foot (pcf), and less than 7.0 pcf. In at least another embodiment, the suitable structural foam materials will have a density of 2.0 to 4.0 pcf, and in yet other embodiments of 2.5 to 3.5 pcf. Density of the structural foam material can be measured in accordance with ASTM test method No. D3574.

In at least one embodiment, suitable structural materials will have a hardness of 150 to 250 N (Newtons), in at least another embodiment of 175 to 230 N, and in at least another embodiment of 190 to 215 N. Hardness can be measured by ASTM test method No. D3574 and at 25% compression or deflection. In at least one embodiment, suitable structural materials will have a compression strength of 20 to 100 psi, in at least another embodiment of 30 to 80 psi, and in at least another embodiment of 35 to 65 psi, as measured in accordance with ASTM test method No. D3574.

In at least one embodiment, the structural layer 30 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like.

In at least one particular preferred embodiment, the EPO is expanded polypropylene (EPP) and its copolymers with ethylene, propylene and butylene. Any suitable EPP may be used, however in at least one embodiment, suitable EPP's include, but are not limited to, ARPRO® EPP available from JSP International and EPP available from Createch LTD.

Expanded polyolefins can be prepared by a bead polymerization process in which relatively small uniform beads of polymer are produced, containing a gas which is later utilized to effect blowing during the molding process. The most commonly used gas is air although other gases including low boiling point liquids which produce gases at the molding temperatures may be used. Suitable gases include, but are not limited to air, nitrogen, carbon dioxide, pentene and the like.

While the structural layer 30 can have any suitable size and configuration, in at least one embodiment, the structural layer 30 has an average thickness of 5 to 100 mm, in other embodiments of 20 to 70 mm, and in yet other embodiments of 30 to 50 mm. The structural layer 30 may be a seat body that is adapted to be mounted within the vehicle.

The cushion layer 32 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness of 175 N (Newtons) to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 KPa, in another embodiments of 20 to 28 KPa, and in yet other embodiments of 23-26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems, and Dow Chemical. Any suitable soy-based polyurethane may be used, however in at least one embodiment, suitable soy-based polyurethanes include, but are not necessarily limited to those available from Woodbridge Foam. The cushion layer 32 can be any suitable size and shape, however, in at least one embodiment, the cushion layer 32 has an average thickness of 20 to 100 mm, and in at least another embodiment of 30 to 70 mm, and in still yet other embodiments of 40 to 60 mm. The cushion layer 32 may be a seat component that is provided adjacent to the seat body, which may be the structural layer 30.

As discussed, the vehicle seat assembly 10 also includes trim material 22 which is adapted to engage the cushion composite 20 in a covering relationship. The trim material 22 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 22, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass, nylon, polyester or natural fibers may be applied to the foam backing or back of the trim material 22 for increase in strength without increasing rigidity. In at least one particularly preferred embodiment, the trim material 22 comprises polyester or nylon trim material having polyester or nylon trim fasteners (not shown) for securing the trim material 22 to one or more components (i.e., cushion 20 and/or frame 14) of the vehicle seat assembly 10.

Figures 3, 4A:
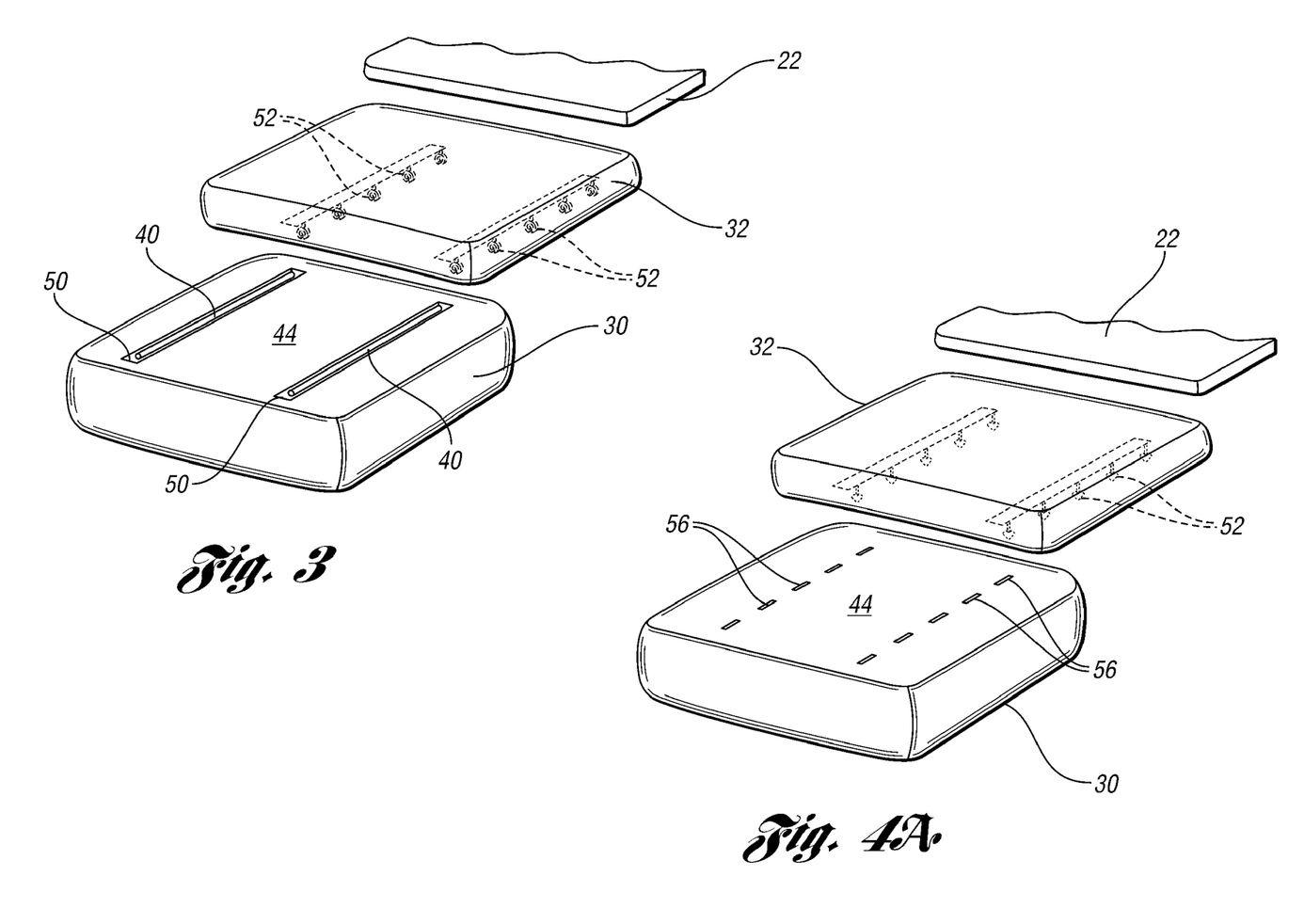
FIG. 3 is a schematic exploded view illustrating an embodiment of a portion of a seat assembly.
FIG. 4A is a schematic exploded view illustrating another embodiment of a portion of a seat assembly.

As seen in FIGS. 2A, 2B and 3, in at least one embodiment, the structural layer 30 includes a plurality, and in other embodiments, at least one embedded attachment member 40. The embedded attachment members 40 can be embedded within the structural layer 30 in any suitable manner. For instance, they could be press fit within the structural layer 30 or they can be molded into the structural layer during the molding of the structural layer. Also, the attachment members 40 could be adhered or otherwise secured to the structural layer 30. As shown in FIG. 2A and 2B, the attachment members 40 are molded to both the top and bottom surfaces 44 and 48 of the structural member 30. It should be understood, that the attachment members 40 could also be molded to the side surfaces of the structural member 30. Also, as can be seen in FIG. 3, the structural member 30 can also have trenches 50 in its upper surface 44 wherein the attachment members 40 could also be secured. Second attachment members, shown as clips 52, can be used to secure the trim material 22 to the structural layer 30. The clips 52 can be molded or sewn to, or otherwise attached to, the trim material 22 and/or the comfort layer 32 at desired location for securing the trim to the seat assembly. The clips 52 can then be secured to the attachment members 40 to secure the trim material 22 and/or the comfort layer 32 to the structural layer and thus the seat assembly. As further shown in FIGS. 2A and 2B, the attachment members 40 and clips 52 which attach the structural member 30 to the comfort layer 32 may not be secured to the trim layer 22. Additional attachment members, shown as clips 52. may be used to secure the trim material 22 to the structural member 30, comfort layer 32 or the frame 14. and thus to the seat assembly 10.

Figure 4B:
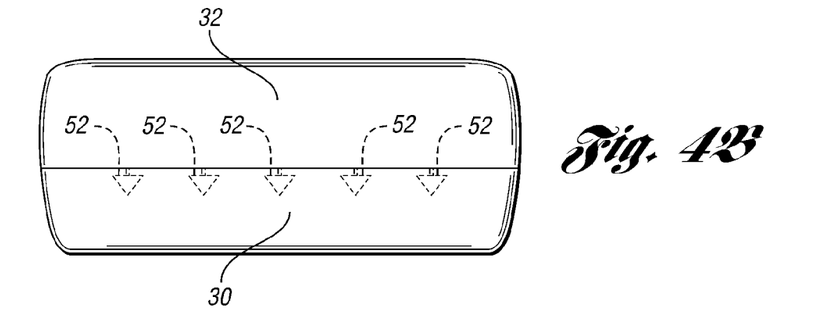
FIG. 4B is a schematic front view illustrating an embodiment of a portion of a seat assembly.
Figure 4C:
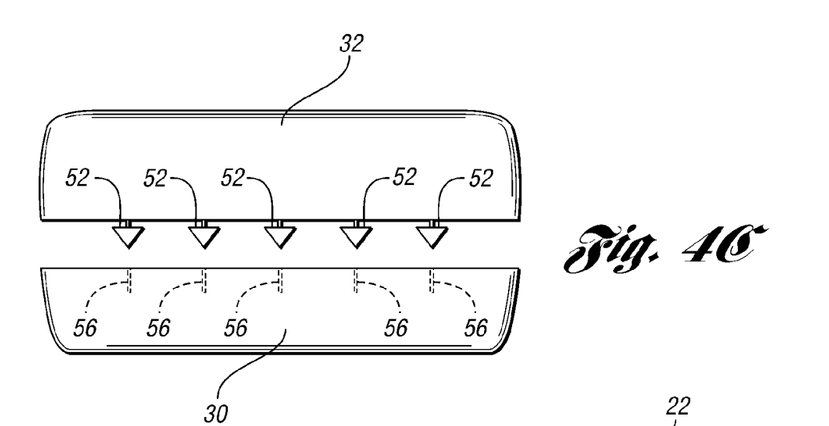
FIG. 4C is a view similar to FIG. 4B illustrating the components in a spaced apart orientation.

As schematically shown in FIGS. 4A, 4B and 4C, rather than having attachment members embedded within the structural layer, the clips 52 could be provided with a saw tooth type design such as a Christmas tree type design which can then be secured into the structural layer 30. The structural layer 30 could be premolded or have grooves 56 cut therein to facilitate attachment of the clips to the structural member 30.

Figure 5:
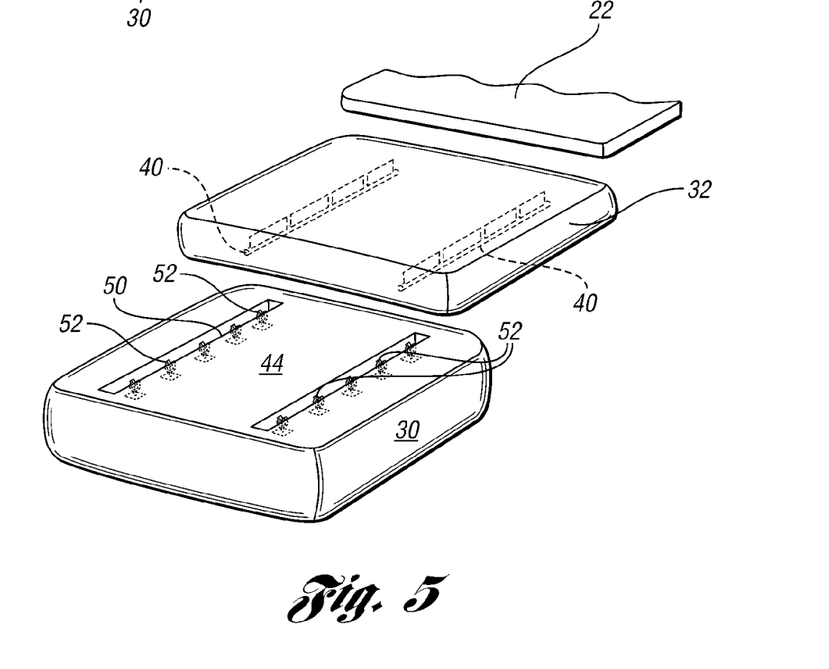
FIG. 5 is an exploded schematic view of a component of yet another embodiment of a seat assembly.
Figure 6A:
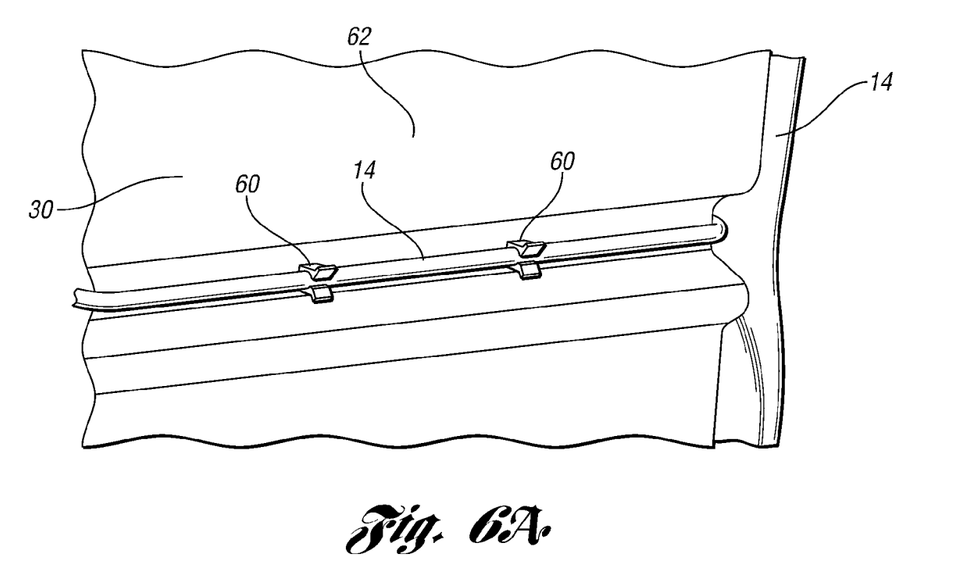
FIGS. 6A-6D are schematic perspective views illustrating another embodiment of a portion of a seat assembly.
Figure 6B:
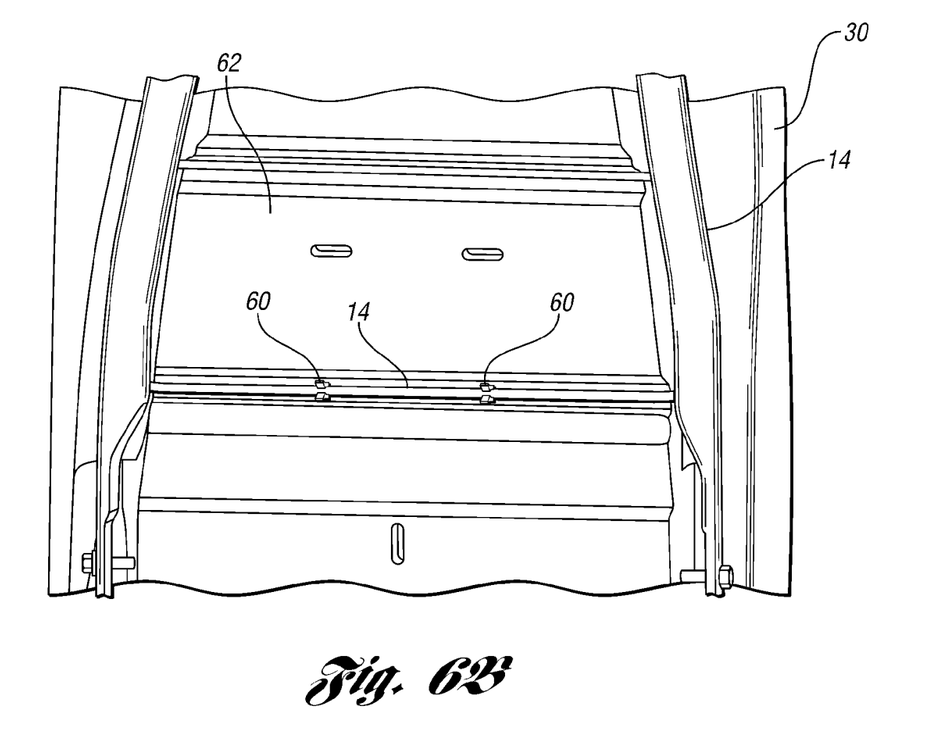
Figure 6C:
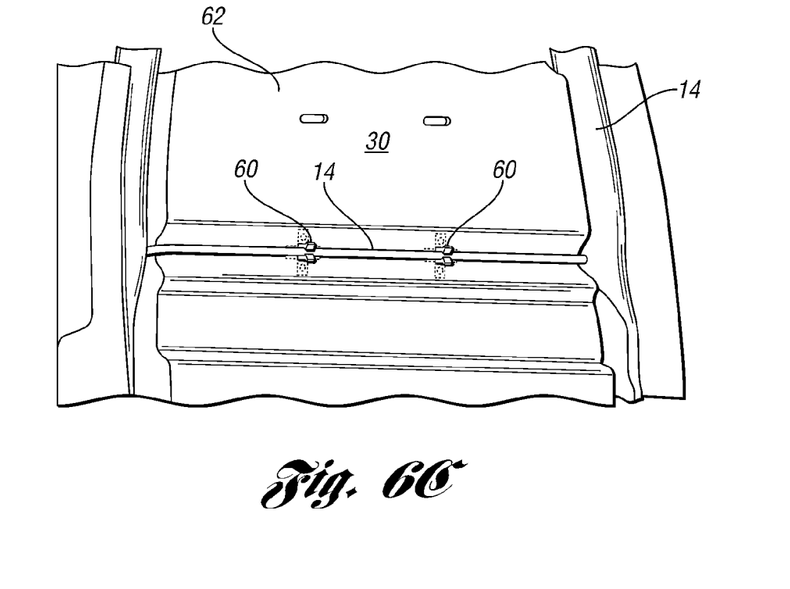
Figure 6D:
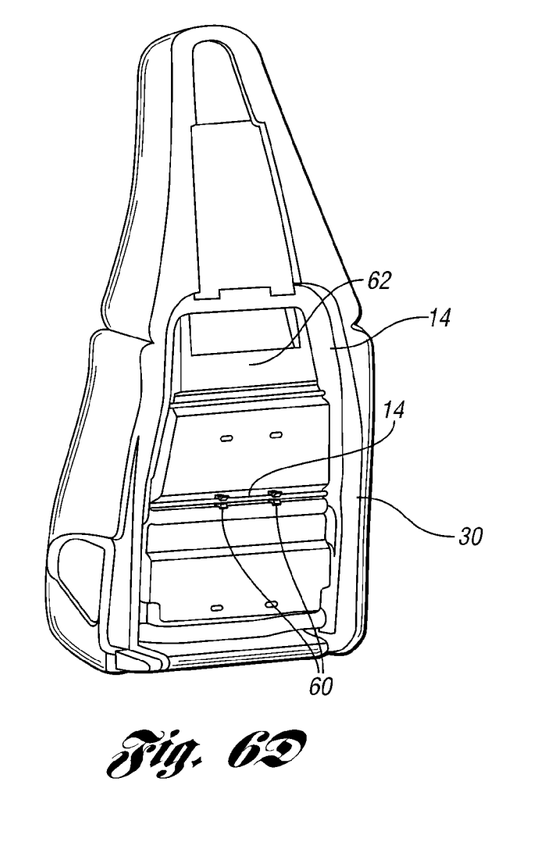

As can be seen in FIG. 5, the positioning of the clips 52 and the attachment members 40 are reversed. In this illustrated embodiment, the clips 52 are molded into, or otherwise secured to, the structural layer 30 and the attachment members 40, such as an okie strip or other suitable attachment member, are secured to the trim material 22 with another end being securable to the embedded clips.

Referring to FIGS. 6A-6D, another embodiment is schematically shown. In this embodiment, clips 60 can be molded or otherwise attached to the rear surface 62 of the structural layer 30. The clips 60 can then be clipped to the frame 14 or seat pan. This can help improve the stability of the comfort layer during dynamic movement of the occupant. This can also provide for more flexibility in a manner by which the trim is attached to the rear of a seat structure and closing out the trim. The layer system can be snapped into place with pressure. This can help reduce the need for complex trim attachments to the frame and allows for direct trim attachment to either the structural layer or other layers of components such as the foam layer 32.

Figures 7A, 7B:
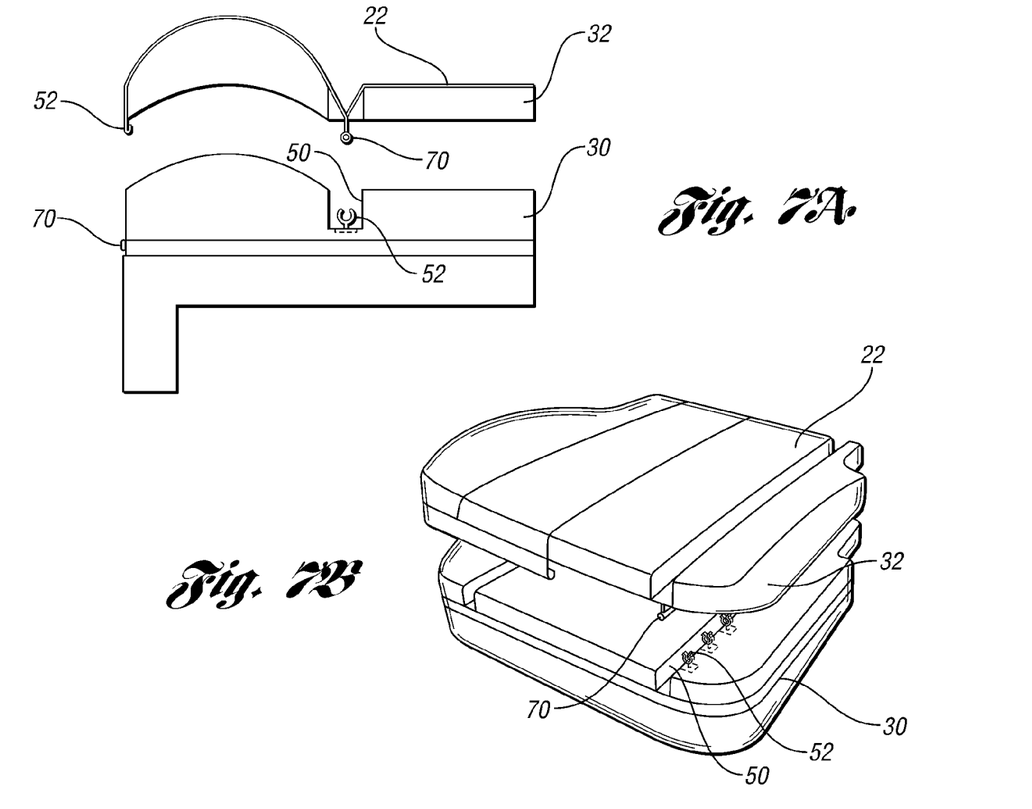
FIGS. 7A and 7B are schematic views illustrating a portion of another embodiment of a seat assembly.
Figure 8:
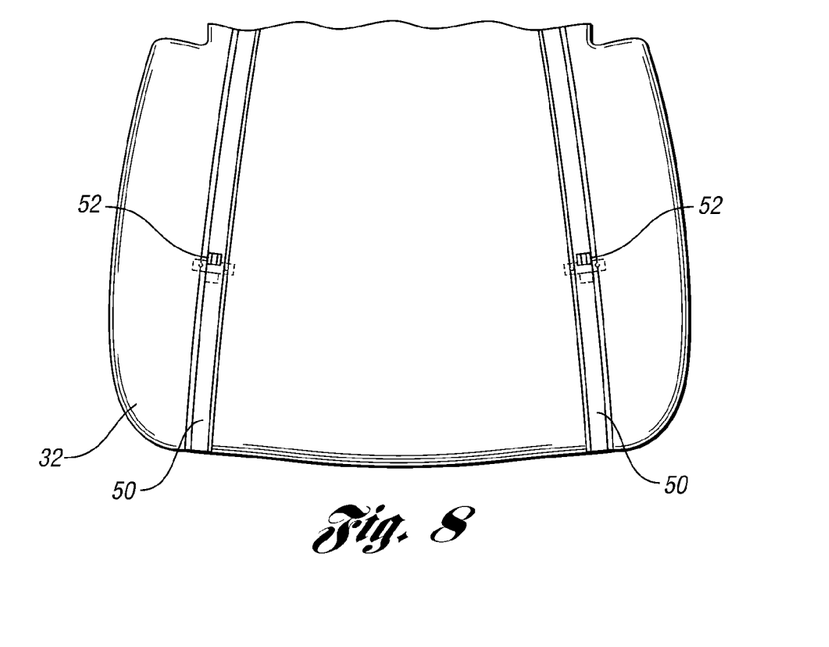
FIG. 8 is a schematic perspective view of a portion of another embodiment of a seat assembly.
Figure 10:
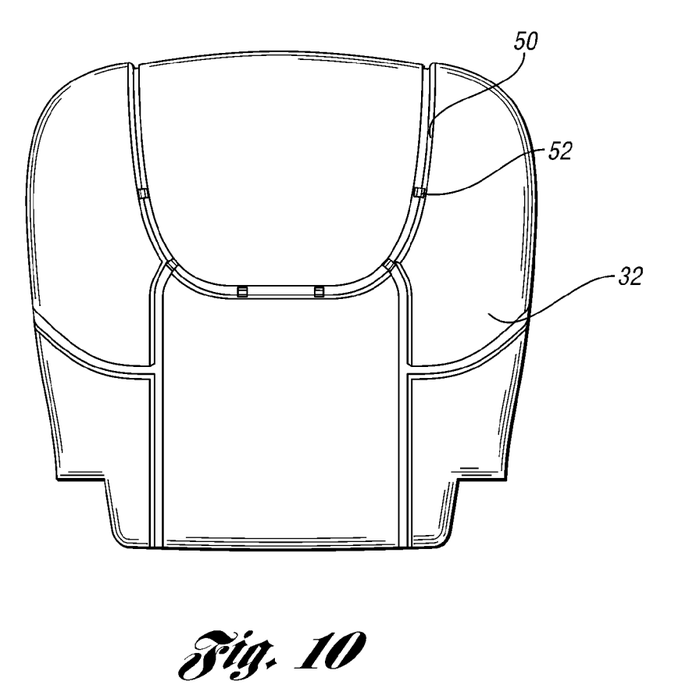
FIG. 10 is a schematic perspective view of a portion of another embodiment of a seat assembly.

Referring to FIGS. 7A and 7B, clips and/or attachment members 52, 70 can be molded into one or more of the structural layer 30, the foam layer 32 and the trim material 22. As illustrated in FIG. 8, clips 52 are provided within trenches 50 on the foam layer 32. In FIG. 10, another embodiment of clips 52 is illustrated within a trench 50. Of course, any suitable orientation for the clips 52 and trenches 50 is contemplated within the scope of the disclosed embodiments. In FIGS. 7A-8 and 10, the clips 52 can operate to hold the layers together. For instance, the structural layer can be easily secured in this manner to the foam or cushion layer. This attachment scheme also enables a design for removable trim cover that dissociates the A-surface trim style from the means to retain the foam and cover to the structural layer. The foam trim module can then be attached to the structural layer by trim clips which allows the foam trim module to be slid forward and out of the clips, or otherwise removed. The edge of the trim can be secured to the structural layer be retainer, zipper or plastic strips and clips. This foam top surface may be broken up into sections sewn to the lower trim layer as styling dictates. This can allow the foam-trim module to be slid forward and out of the clips. The edge of the trim can be secured to the structural layer by a retainer, zipper or plastic strips and clips.

The use of clips made of carbon polymers and molded into a like layer for ultimate attachment of the layers to the other layers can help facilitate end of use recycling. Compatible materials would be used for the clips such that they would be compatible and not need to be separated from the layer for recycling purposes. For instance, if the comfort layer was made of polyurethane, the clips could be made of TPU. Moreover, if the structural layer was made of EPP, the clips could be made of PP and in particular crystalline PP. The ability to readily change out the insert region for customization or to conform to a particular occupant is provided by the embodiment. Moreover, the present invention provides common polymer content of interior system layers which facilitates ease of recycling when the product is dissembled at the end of life. Furthermore, the ability to change the insert regions to customize either appearance or performance for the occupant or for wear reason is also provided by this embodiment.

Figure 9:
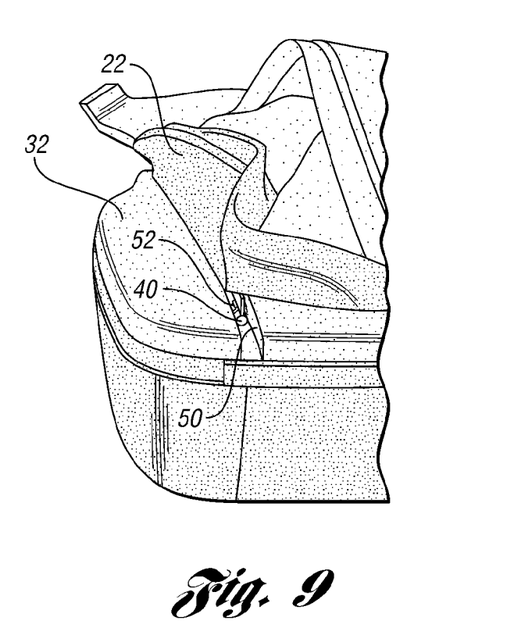
FIG. 9 is a schematic perspective view of a portion of another embodiment of a seat assembly.

In FIG. 9, the attachment member 70 is engaged within the clips 52 of FIGS. 7A-8. In the depicted embodiment, the attachment member 70 is mounted to trim 22, which is pulled back for illustrative purposes. The attachment member 70 attaches the trim 22 to the foam layer 32.

Figure 11:
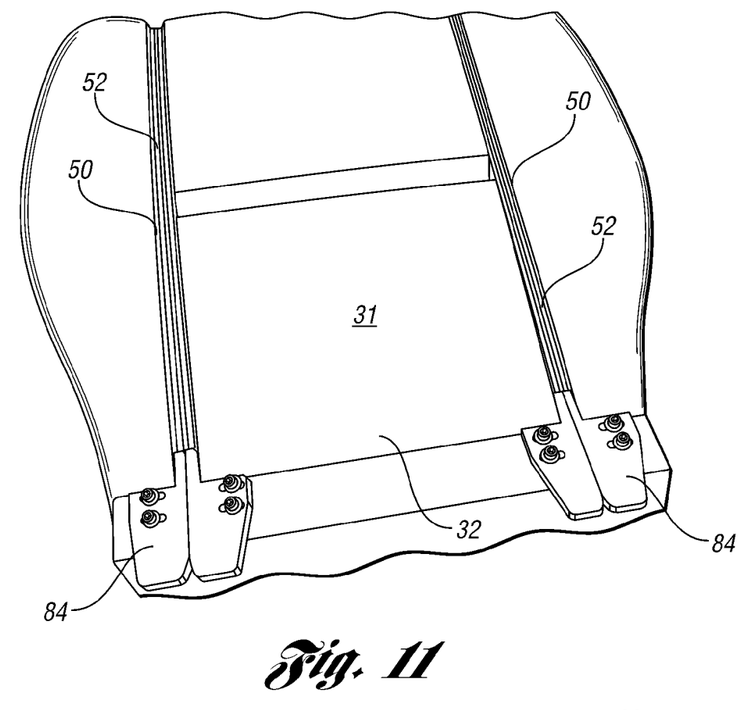
FIG. 11 is a schematic perspective view of a portion of yet another embodiment of a seat assembly.

With reference now to FIG. 11, a seat component illustrated as a seat cushion 32 for use with a seat bottom is depicted. In the illustrated embodiment, an upper surface 31 of seat cushion layer 32 is visible. Seat cushion 32 is equipped with a pair of attachment members illustrated as elongate channels 52 which are attached to seat cushion 32. Although the elongate channels 52 are shown formed within the seat cushion 32, the elongate channels 52 may also be formed within a seat body which may be a structural layer 30, illustrated in FIGS. 2A-5. In the embodiment depicted in FIG. 11, elongate channels 52 are made of polypropylene and extend nearly the entire length of seat cushion 32 from back to front. In other embodiments, elongate channels 52 may be oriented to run from one side of seat cushion 32 to the other and may extend either longer or shorter distances across the surface to which they are attached and can have space between adjacent channel 52 within a trench 50.

Figure 15:
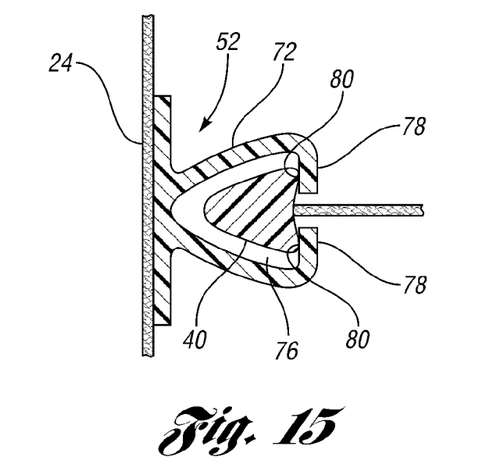
FIG. 15 is a cross-sectional view of an embodiment of a channel of the seat assembly of FIG. 1.
Figure 16:
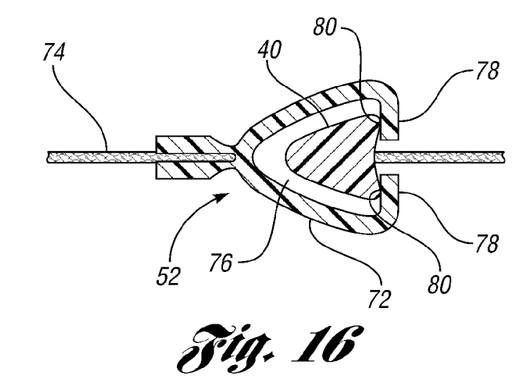
FIG. 16 is another cross-sectional view of another embodiment of a channel of the seat assembly of FIG. 1.
Figure 17:
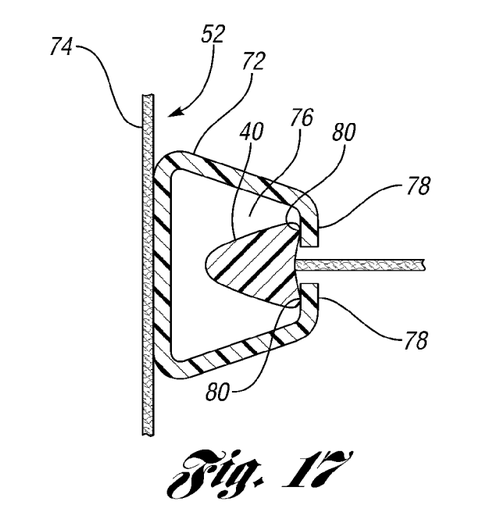
FIG. 17 is another cross-sectional view of yet another embodiment of a channel of the seat assembly of FIG. 1.

Various embodiments of elongate channels 52 are illustrated in FIGS. 15-17. These views are cross-sectional views of elongate channels 52. Elongate channels 52 include a bead engagement portion 72 and a seat body engagement portion 74 (alternately referred to herein as a seat cushion engagement portion or a substrate engagement portion). In some embodiments, seat body engagement portion 74 may be made of a polypropylene fabric that can be non-woven and needle-punched. Each of the illustrated embodiments of bead engagement portion 72 illustrated in FIGS. 15-17 includes a bead receiving compartment 76 and bead retention protrusions 78. At least one end, and in some embodiments, both ends of the channel 52 are open to receive a second attachment member, such as a bead or okie 40.

In the embodiment depicted in FIG. 11, each elongate channel 52 is disposed within a trench 50 defined in an upper surface of seat cushion 32. Each elongate channel 52 is disposed within each trench 50 so as to be substantially flush with the bottom of each trench 50. In other embodiments, an upper portion of elongate channel 52 may be flush with an upper surface of seat cushion 32 while in still other embodiments, an upper surface of elongate channel 52 may protrude above an upper surface of seat cushion 32. In still other embodiments, seat cushion 32 may not include trenches 50 and an upper surface of elongate channels 52 may be either flush with an upper surface of seat cushion 32 or may protrude above an upper surface of seat cushion 32.

Seat cushion 32 may be a molded component and may be made of a foam material such as polyurethane. Elongate channels 52 may be molded into seat cushion 32 when seat cushion 32 is formed. Elongate channels 52 may be inserted into a mold or tool for forming seat cushion 32 and may be held in position within the mold on blanks which are disposed between bead retention protrusions 78 and which at least partially enter bead receiving compartment 76 during the molding process to prevent foam from filling bead receiving compartment 76 during the molding process. Additional inserts may be included in the mold to prevent foam from entering bead receiving compartment 76 from either or both ends of elongate channels 52. As seat cushion 32 is molded, the polyurethane or other material will come into contact with, surround and envelope seat body engagement portion 74, and thus retain elongate channels 52 within seat cushion 32 after the molding process is complete. In embodiments where seat body engagement portion 74 is made of fabric or other porous material, polyurethane foam or other foam material comprising seat cushion 32, or other molding material may permeate seat body engagement portion 74 to form a mechanical bond that interlocks with seat body engagement portion 74.

In some embodiments, elongate channels 52 are formed by a process of extrusion. In some embodiments, such as that depicted in FIG. 16, seat body engagement portion 74 is extruded together with elongate channels 52 such that a strong mechanical bond may be formed between the seat body engagement portion 74 and elongate channels 52. In other embodiments, seat body engagement portion 74 may be sewn to the elongate channel 52. In still other embodiments, seat body engagement portions 74 may comprise a rigid material that is heat staked or bonded to elongate channels 52 through the use of epoxy or other methods of attachment. In other embodiments, seat body engagement portion may be integral with elongate channels 52 and extruded together therewith.

Figure 12:
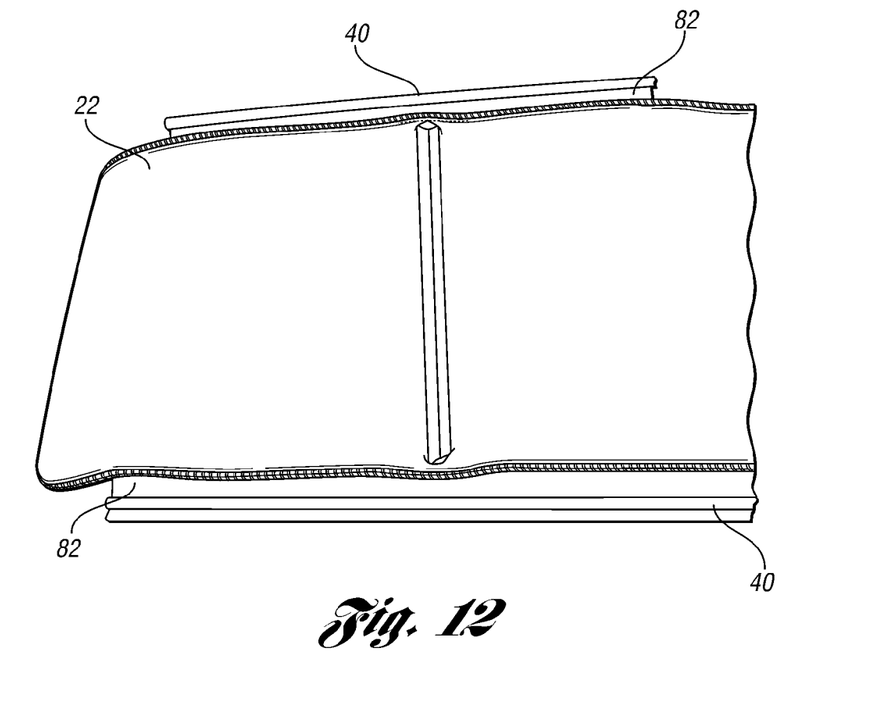
FIG. 12 is a schematic perspective view of a portion of another embodiment of a seat assembly.

With respect to FIG. 12, an example of a seat cover 22 is illustrated. Seat cover 22 includes a pair of elongate beads or okies 40. Beads 40 are configured to fit within bead receiving compartment 76 and to be retained within bead receiving compartment 76 by bead retention protrusions 78 (see FIGS. 15-17). Each bead 40 includes a pair of flanges 80 which flare out from a central axis of bead 40 so as to render bead 40 too wide to fit between bead retention protrusions 78. Bead 40 also includes a seat cover engaging portion 82 which may be a portion of seat cover 22 or which may be an intermediate material used to join bead 40 to seat cover 22. In some embodiments, seat cover engaging portion 82 may be extruded with bead 40. In other embodiments, seat cover engaging portion 82 may be sewn to bead 40.

Seat cover 22 may be attached to seat cushion 32 by placing seat cover 22 over seat cushion 32 and aligning bead 40 with an end of elongate channel 52. In embodiments where a plurality of beads 40 and a plurality of elongate channels 52 are employed, each bead 40 is aligned with an end of each respective elongate channel 52. Once the bead 40 is aligned with the end of elongate channel 52, the bead 40 may be inserted into the bead receiving compartment 76 such that seat cover engaging portion 82 is disposed between bead retention protrusions 78. Once oriented in this fashion, seat cover 22 may be pulled longitudinally with respect to seat cushion 32 such that the entire length of bead 40 is guided into bead receiving compartment 76. Stops may be provided or integrally molded into seat cushion 32 at a forward or rear end of elongate channels 52 to prevent bead 40 from coming out of the opposite end of bead receiving compartment 76. Once the entire length of bead 40 has been pulled into bead receiving compartment 76, seat cover 22 is held in place on seat cushion 32 by the obstruction between bead retention protrusions 78 and flanges 80 of elongate channels 52 and beads 40, respectively.

Figure 13:
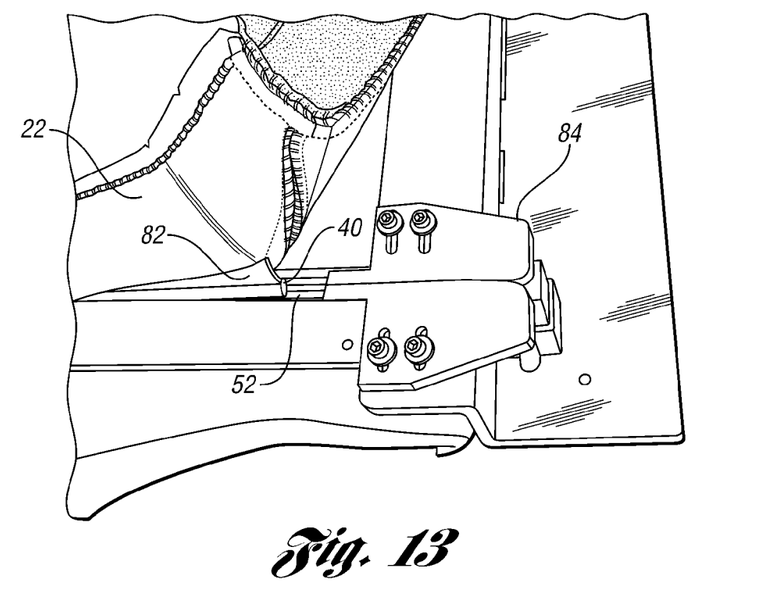
FIG. 13 is a schematic perspective view of the portion of the seat assembly of FIG. 11 engaged with the portion of the seat assembly of FIG. 12.

FIG. 13 illustrates a prototype of a funnel 84 which may be used to help guide bead 40 into elongate channel 52. In this manner, funnel 84 may assist an operator in quickly aligning the ends of beads 40 with elongate channels 52.

Figure 14:
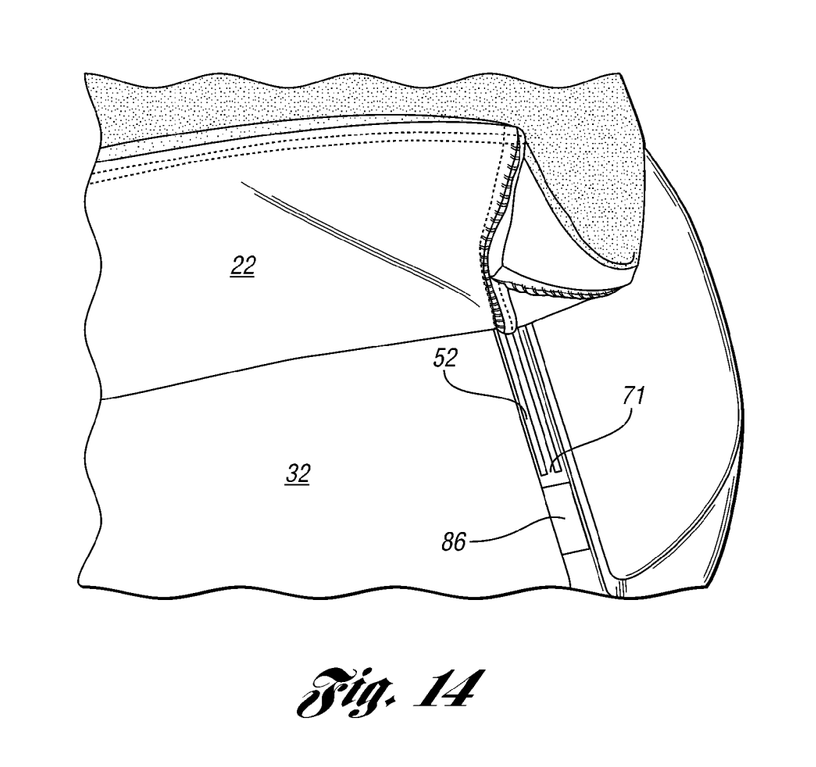
FIG. 14 is another schematic perspective view of FIG. 13.

FIG. 14 illustrates a distal end of elongate channel 71 and a blocker 86 integrally molded with seat cushion 32 to prevent the end of bead 40 from being pulled out of the distal end 71 of elongate channel 52 (the distal end being the end opposite the end where bead 40 is introduced into elongate channel 52).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
   a structural layer formed of a first foam material, the structural layer adapted to be mounted to a seat frame within a vehicle to provide support to an occupant;
   a cushion layer formed of a second foam material and provided adjacent to the structural layer;
   a first attachment member mounted directly on one of the structural layer and the cushion layer;

a second attachment member mounted directly on the other of the structural layer and the cushion layer; and a trim covering layer covering the structural layer and the cushion layer;

wherein the second attachment member is engageable within the first attachment member such that the cushion layer is attached to the structural layer through engagement between the first attachment member and the second attachment member and the first and second attachment members do not attach to the trim covering layer, for easy disassembly of the first and second materials in order to separate for end of life recyclability.

2. The vehicle seat assembly of claim 1 further comprising a trench defined in an upper surface of the structural layer such that the first attachment member is disposed substantially within the trench.

3. The vehicle seat assembly of claim 1 wherein the first attachment member further comprises at least one clip embedded within one of the structural layer and the cushion layer such that the second attachment member is retained by the at least one clip.

4. The vehicle seat assembly of claim 1 wherein the first attachment member further comprises an elongate channel embedded within one of the structural layer and the cushion layer; and wherein the second attachment member further comprises an elongate bead provided on the other of the structural layer and the cushion layer that is slidably engageable within the elongate channel.

5. The vehicle seat assembly of claim 4 further comprising a funnel mounted proximate the elongate channel to guide the elongate bead into the elongate channel.

6. The vehicle seat assembly of claim 4 further comprising a blocker integrally molded in a distal end of the elongate channel to prevent an end of the elongate bead from being removed from the elongate channel.

7. The vehicle seat assembly of claim 4 wherein the elongate channel includes a bead engagement portion and a structural layer engagement portion such that the structural layer engagement portion is molded into the structural layer to retain the elongate channel on the structural layer.

8. The vehicle seat assembly of claim 4 wherein the elongate channel comprises a bead engagement portion and a structural layer engagement portion such that the structural layer engagement portion is attached to the bead engagement portion.

9. A vehicle seat assembly comprising:
a cushion composite comprising:
  a structural layer adapted to be secured to a seat frame having an upper surface;
  a cushion layer covering the upper surface and directly attached to the structural layer along a lower surface, the cushion layer having a seating surface opposite the lower surface;
  one or more first attachment members embedded either in the upper surface of the structural layer or the lower surface of the cushion layer in order to releasably attach the structural layer to the cushion layer to form the cushion composite;
at least one second attachment member embedded in one of the structural layer, the cushion layer or the seat frame; and
a trim material secured over the seating surface and secured to the cushion composite by the second attachment member and not by the first attachment member so that the trim material is easily disassembled from the cushion composite in order to separate the materials for end of life recyclability.

10. The vehicle seat assembly of claim 9 wherein clips are provided on one of the trim material and the cushion layer and are attachable to the attachment members to releasably secure the cushion layer to the structural layer.

11. The vehicle seat assembly of claim 9 wherein clips are secured to the trim material and extend through the cushion layer to releasably attach to the attachment members embedded in the structural layer to releasably secure the trim material to the structural layer of the cushion composite.

12. The vehicle seat assembly of claim 9 wherein the at least one other attachment member is embedded in a bottom surface of the structural layer to secure a portion of the trim material wrapped around the composite assembly.

13. The vehicle seat assembly of claim 9 further comprising trim attachment clips embedded within the structural layer such that a strip is secured to the embedded attachment clips.

14. The vehicle seat assembly of claim 1 further comprising:
a trim material provided over the cushion layer to form a seating surface;
a third attachment member embedded in a bottom surface of the structural layer to face away from the seating surface to secure a at least a portion of the trim material to the seat assembly.

15. A vehicle seat assembly comprising:
a seat frame adapted to mount to a vehicle;
a structural layer mounted to the seat frame and formed of a rigid first foam material to provide support to an occupant;
a cushion layer formed of a resilient second foam material and provided adjacent to the structural layer to provide comfort to the occupant;
a first attachment member attached directly on an upper surface of the structural layer; and
a second attachment member attached directly on a lower surface of the cushion layer;
a trim material disposed over the cushion layer to provide a seating surface; and
a third attachment member attached to one of the seat frame, the structural layer or the comfort layer,
wherein the cushion layer is assembled to the structural layer through engagement between the first attachment member and the second attachment member to form a composite cushion body, the trim material thereby wrapped around and secured to the composite cushion body by the third attachment member and whereby the trim material is not secured by the first or second attachment member, for easy disassembly of the first foam, second foam and trim materials in order to separate the materials for end of life recyclability.

16. The vehicle seat assembly of claim 1 wherein the at least one other attachment member is embedded in the seating surface of the cushion layer to secure a portion of the trim material.

17. The vehicle seat assembly of claim 1 wherein the first attachment member is mounted along a upper surface of the structural layer and the second attachment member is mounted along a lower surface of the cushion layer, opposite a seating surface, the seating surface covered by the trim covering layer wherein the first and second attachment members do not attach to the trim covering layer.

18. The vehicle seat assembly of claim 1 wherein the first foam material has a density greater than the second foam material.

19. The vehicle seat assembly of claim 1 wherein the first foam material is formed of EPP-type of material and the second foam material is formed of a polyurethane material.

* * * * *

UNITED STATES PATENT AND TRADEMARK OFFICE
Certificate

Patent No. 7,946,649 B2                                                Patented: May 24, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ashford A. Galbreath, Troy, MI (US); Asad S. Ali, Troy, MI (US); Richard Reyes, Clinton Township, MI (US); Jeffrey Frelich, Commerce Township, MI (US); Ronald L. Miotto, Redford, MI (US); James B. Clauser, Oakland Township, MI (US); George Edward Dishner, Davison, MI (US); William Paruszkiewicz, Clinton Township, MI (US); Paul S. Severinski, Brownstown, MI (US); and Thomas Allen Welch, Sr., Ortonville, MI (US).

Signed and Sealed this Ninth Day of December 2014.

DAVID R. DUNN
*Supervisory Patent Examiner*
Art Unit 3636
Technology Center 3600